(12) United States Patent
Ness

(10) Patent No.: US 7,238,655 B2
(45) Date of Patent: Jul. 3, 2007

(54) PERFUME ENCAPSULATES

(75) Inventor: Jeremy Nicholas Ness, Ashford (GB)

(73) Assignee: Quest International Services B.V., Naarden (NL)

( * ) Notice: Subject to any disclaimer, the term of this patent is extended or adjusted under 35 U.S.C. 154(b) by 215 days.

(21) Appl. No.: 10/471,611

(22) PCT Filed: Mar. 13, 2002

(86) PCT No.: PCT/GB02/01133

§ 371 (c)(1),
(2), (4) Date: Sep. 12, 2003

(87) PCT Pub. No.: WO02/074430

PCT Pub. Date: Sep. 26, 2002

(65) Prior Publication Data

US 2004/0087477 A1 May 6, 2004

(30) Foreign Application Priority Data

Mar. 16, 2001 (GB) ................................ 0106560.6

(51) Int. Cl.
*G01N 30/00* (2006.01)

(52) U.S. Cl. ..................... 512/4; 424/451; 510/523

(58) Field of Classification Search ................ 424/451, 424/455, 489, 490; 512/4; 510/523
See application file for complete search history.

(56) References Cited

U.S. PATENT DOCUMENTS 4,062,799 A * 12/1977 Matsukawa et al. ......... 264/4.3
4,100,103 A    7/1978 Foris et al.
4,251,386 A    2/1981 Saeki et al.
5,043,161 A    8/1991 Scarpelli et al.
5,180,637 A * 1/1993 Sumii .................... 428/402.21

FOREIGN PATENT DOCUMENTS

EP        0 364 922 A    4/1990

* cited by examiner

*Primary Examiner*—Jill Warden
*Assistant Examiner*—Samuel P. Siefke
(74) *Attorney, Agent, or Firm*—Morgan Lewis Bockius LLP

(57) ABSTRACT

A perfume encapsulate comprises an aminoplast capsule, the capsule shell comprising urea-formaldehyde or melamine-formaldehyde polymer and a second polymer comprising a polymer or copolymer of one or more anhydrides, preferably ethylene/maleic anhydride copolymer. The second polymer improves the stability of the capsules with respect to surfactant, thus improving perfume retention properties and enabling use of the capsules in aqueous surfactant-containing products in a way that has not hitherto been possible.

6 Claims, No Drawings

PERFUME ENCAPSULATES

FIELD OF THE INVENTION

This invention concerns perfume encapsulates, and relates to perfume encapsulates, a method of making the encapsulates and aqueous products including the encapsulates.

BACKGROUND TO THE INVENTION

It is known to encapsulate perfume in small capsules (or micro-capsules), typically having a diameter less than 1000 microns, for a variety of reasons relating to the protection, delivery and release of perfume. One type of capsule, referred to as a wall or shell capsule, comprises a generally spherical hollow shell of perfume-insoluble material, typically polymer material, within which perfume is contained.

Various methods are known for making shell capsules, including in situ polycondensation for producing so-called aminoplast resin capsules from urea-formaldehyde or melamine-formaldehyde polymers. Briefly, the process involves forming a dispersion or emulsion of the perfume in an aqueous solution of urea-formaldehyde or melamine-formaldehyde precondensate under appropriate conditions of agitation to produce capsules of a desired size, and adjusting the reaction conditions to cause condensation of the precondensate by acid catalysis, resulting in the condensate separating from solution and surrounding the dispersed perfume fill to produce micro-capsules.

Perfume-containing aminoplast capsules are currently primarily used in the area of perfume sampling as so-called "scratch and sniff" products, where the capsules are applied to paper or cardboard and show excellent perfume retention properties over extended periods, with the capsule functioning to prevent evaporation of the perfume until the capsules is ruptured. Such capsules can similarly be applied to textiles etc, and also show good stability.

It has been proposed to use such capsules in shampoo and other aqueous surfactant-containing products to give various fragrance effects, e.g. burst release in-use, enhanced deposition, longevity, stability improvement etc. However, in practice serious storage problems arise with shell encapsulates in such products, in that surfactant is able to enter the capsule through the wall and causes the perfume contents to leach out. Aminoplast capsules are most resistant to this effect, but nevertheless still exhibit quite rapid perfume loss such that they are of no practical use in such products. In this connection, see the article "Use of amino resin microcapsule dispersions in cosmetics" in Parfumerie und Kosmetik, 72 Jahrgang, Nr. 7/91.

The present invention is concerned with modified aminoplast capsules having properties enabling use in aqueous surfactant-containing products.

SUMMARY OF THE INVENTION

In one aspect the present invention provides a perfume encapsulate comprising an aminoplast capsule, the capsule shell comprising urea-formaldehyde or melamine-formaldehyde polymer and a second polymer comprising a polymer or copolymer of one or more anhydrides.

The second polymer preferably comprises a polymer or copolymer of one or more cyclic anhydrides, preferably maleic anhydride. It is particularly preferred that the second polymer comprises ethylene/maleic anhydride copolymer.

The aminoplast capsule preferably comprises melamine-formaldehyde polymer resin.

The aminoplast capsule may be made in generally conventional manner, e.g. as described in GB 2073132-A and WO 98/28396 (see Examples 15 and 16).

In a further aspect, the invention provides a method of making a perfume encapsulate, comprising forming a dispersion of perfume in an aqueous solution of urea-formaldehyde or melamine-formaldehyde precondensate and a second polymer comprising a polymer or copolymer of one or more anhydrides; and causing polymerisation of the precondensate to produce perfume-containing aminoplast capsules.

The dispersion is suitably agitated or stirred, with polymerisation occurring by acid-catalysed condensation reaction.

The resulting capsules may be separated, e.g. by filtering.

It is found that the presence of the second polymer improves the stability of the capsules relative to surfactant, thus improving perfume retention properties. The mechanism by which the second polymer improves the stability of the capsules is not fully understood, but it can be speculated that the second polymer is incorporated into the urea-formaldehyde or melamine-formaldehyde polymer structure in such a way that it can stiffen the capsule walls and prevent formation of any porosity that would allow the ingress of surfactant to the capsule interior.

GB 2073132-A refers on page 2 line 52 to the possible use of ethylene/maleic anhydride copolymer, although this is stated not to be within the scope of the invention of that specification. The previous line of the specification refers to polyvinyl alcohol in similar terms, although as will be apparent from the Example below polyvinyl alcohol does not function to improve capsule stability in the same way as the second polymer of the present invention. Furthermore, that specification does not concern perfume encapsulates but relates particularly to capsules for use in pressure-sensitive copying systems. GB 2703132-A is concerned with stabilising the liquid fill/precondensate dispersion, and makes no reference to the stability properties of the resulting capsules.

The term "perfume" is used in this specification to mean any odoriferous material generally (but not necessarily) having an odour that is considered pleasant or attractive, or any material which acts as a malodour counteractant.

As is well known, a perfume normally consists of a mixture of a number of perfumery materials, each of which has an odour or fragrance. The number of perfumery materials in a perfume is typically 10 or more. The range of fragrant materials used in perfumery is very wide; the materials come from a variety of chemical classes, but in general are water-insoluble oils. In many instances, the molecular weight of a perfumery material is in excess of 150, but does not exceed 300.

The perfumes used in the present invention can be mixtures of conventional perfumery materials. Such materials are, for example, natural products such as extracts, essential oils, absolutes, resinoids, resins, concretes etc., but also synthetic materials such as hydrocarbons, alcohols, aldehydes, ketones, ethers, acids, esters, acetals, ketals, nitriles, etc., including saturated and unsaturated compounds, aliphatic, carbocyclic, and heterocyclic compounds.

Such perfume materials are mentioned, for example, in S. Arctander, Perfume and Flavor Chemicals (Montclair, N.J., 1969), in S. Arctander, Perfume and Flavor Materials of Natural Origin (Elizabeth, N.J., 1960) and in "Flavor and Fragrance Materials—1991", Allured Publishing Co. Wheaton, Ill. USA.

Examples of perfume materials which can be used in the invention are: geraniol, geranyl acetate, linalol, linalyl acetate, tetrahydrolinalol, citronellol, citronellyl acetate, dihydromyrcenol, dihydromyrcenyl acetate, tetrahydromyrcenol, terpineol, terpinyl acetate, nonpol, nopyl acetate, 2-phenyl-ethanol, 2-penylethyl acetate, benzyl alcohol, benzyl acetate, benzyl salicylate, styrallyl acetate, benzyl benzoate, amyl salicylate, dimethylbenzyl-carbinol, trichloromethylphenyl-carbinyl acetate, p-tert-butylcyclohexyl acetate, isononyl acetate, vetiveryl acetate, vetiverol, α-hexylcinnamaldehyde, 2-methyl-3-(p-tert-butylpheyl)propanal, 2-methyl-3-(p-isopropylphenyl)propanal, 2-(p-tert-butylpheyl)-propanal, 2,4-dimethyl-cyclohex-3-enyl-carboxaldehyde, tricyclodecenyl acetate, tricyclodecenyl propionate,4-(4-hydroxy-4-methylpentyl)-3-cyclohexenecarboxyaldehyde, 4-(4-methyl-3-pentenyl)-3-cyclohexenecarboxaldehyde, 4-acetoxy-3-pentyl-tetrahydropyran, 3-carboxymethyl-2-pentylcyclopentane, 2-n-heptylcyclopentanone, 3-methyl-2-pentyl-2-cyclopentenone, n-decanal, n-dodecanal, 9-decenol-1, phenoxyethyl isobutyrate, phenylacetaldehyde dimethyl-acetal, phenylacetaldehyde diethylacetal, geranyl nitrile, citronellyl nitrile, cedryl acetate, 3-isocamphylcyclohexanol, cedryl methyl ether, isolongifolanone, aubepine nitrile, aubepine, heliotropin, coumarin, eugenol, vanillin, diphenyl oxide, hydroxycitronellal, ionones, methylionones, isomethylionones, irones, cis-3-hexenol and esters thereof, indan musks, tetralin musks, isochroman musks, macrocyclic ketones, macrolactone musks, ethylene brassylate.

The perfume should be substantially free of water-miscible materials such as dipropylene glycol. Solvents which can be used for perfumes include, for example: diethyl phthalate, triethyl citrate, isopropyl myristate, etc.

The perfume may optionally include one or more adjuncts. For example, the perfume may include one or more release modifiers, which change the evaporation profile of the perfume after the capsule has been broken; these are essentially fixatives such as non-volatile oils. The perfume may additionally or alternatively include one or more stiffening agents, which function to make the capsule less easy to break, for example by being solid at room temperature. Such an agent could also function as a release agent, e.g. stearyl alcohol. The perfume may additionally or alternatively include other functional additives such as sunscreen agents etc.

The capsules typically have a diameter in the range 1 to 500 microns, preferably 5 to 300 microns, more preferably 10 to 50 microns, with the wall typically having a thickness in the range 0.1 to 50 microns. By modifying process conditions capsules of a desired size can be produced in known manner. If necessary, the capsules as initially produced may be filtered or screened to produce a product of greater size uniformity.

Capsules wall thickness may be regulated and controlled in conventional manner, by varying the relative proportions of perfume and polymer.

The capsule wall or contents may include optional dyes and/or pigments.

The improved stability of the capsules in surfactant resulting from the presence of the second polymer means that the capsules can be used in a range of surfactant-containing water-based products in a way that has not hitherto been possible. Such products include a wide range of consumer products including shampoos and hair conditioners, shower gels and body washes, laundry detergent liquids, fabric rinse conditioners, household cleaners and bleaches, toilet cleaners and bleaches etc. The capsules may also be used in solid products such as bar toilet soap (which typically has about 10% by weight water content).

The invention thus also includes within its scope an aqueous surfactant-containing product (such as those mentioned above) comprising perfume encapsulates in accordance with the invention.

The product may otherwise by of generally conventional composition, as is known to those skilled in the art.

The perfume encapsulates may be incorporated in the product in appropriate amount to achieve desired fragrance effects.

The invention will be further described, by way of illustration, in the following example.

EXAMPLE

This example illustrates the improved stability of the capsules of the invention compared to conventional capsules.

The following perfume was prepared:

Perfume A (all Figures % by Weight)

| | |
|---|---|
| Allyl amyl glycollate | 3.0 |
| Citral diethyl acetal | 5.3 |
| Linalool | 32.0 |
| Linalyl acetate | 30.2 |
| Litsea cubeba oil | 3.0 |
| Orange oil Brazilian | 26.5 |

Capsules of the following composition were produced using the method of Example 15 of WO98/28396:

| | Ingredient (weight in g) | | |
|---|---|---|---|
| | Capsule A | Capsule B | Capsule C |
| Trimethylolmelamine condensate* | 5.0 | 2.5 | 3.0 |
| Polyvinyl alcohol** | — | 2.5 | — |
| Ethylene/maleic anhydride copolymer | — | — | 2.0 |
| Perfume A | 60.0 | 60.0 | 60.0 |

*Beetle resin PT336 ex British Industrial Plastics Ltd
**Gohsenol GH-23 ex Nippon Gohsei By controlling the stirring and other reaction conditions, all three capsule samples were adjusted to approximately the same mean size of 25 μm.

A hair shampoo was prepared with the following base formulation:

| Ingredient | % by weight |
|---|---|
| Sodium lauryl ether (2 mole) sulphate | 9.6 |
| Ammonium lauryl ether (2 mole) sulphate | 4.5 |
| Sodium chloride | 2.0 |
| Citric acid | q.s. to give pH 6.0–6.5 |
| Preservative | q.s. |
| Water | balance to 100% |

Capsules A, B and C were incorporated into the shampoo at a level equivalent to a perfume dosage of 0.2 wt %. These samples were stored in glass jars at 37° C. for one month and samples examined with a transmission light microscope.

Capsules A (aminoplast reference) had lost substantially all of their fragrance contents.

Capsules B (modified aminoplast with polyvinyl alcohol) had lost substantially all of their fragrance contents.

Capsules C (capsules of the invention) had retained the bulk of their fragrance contents.

This example thus illustrates the efficacy of the capsules of the invention in terms of perfume retention properties when incorporated in a surfactant-containing product.

The invention claimed is:

1. An aqueous surfactant-containing product comprising perfume encapsulates having a shell with perfume encapsulated therein, said capsule shell comprising melamine-formaldehyde polymer and a second polymer comprising a polymer or copolymer of one or more anhydrides, said second polymer improving the perfume retention properties of said shell.

2. An aqueous surfactant-containing product according to claim 1, wherein the second polymer comprises a polymer or copolymer of one or more cyclic anhydrides.

3. An aqueous surfactant-containing product according to claim 2, wherein the second polymer comprises maleic anhydride.

4. An aqueous surfactant-containing product according to claim 3, wherein the second polymer comprises ethylene/maleic anhydride copolymer.

5. A product according to claim 1, selected from the group consisting of shampoos and hair conditioners, shower gels and body washes, laundry detergent liquids, fabric rinse conditioners, household cleaners and bleaches, toilet cleaners and bleaches, and bar toilet soap.

6. In an aqueous surfactant-containing product which includes perfume encapsulates having a shell comprising a melamine-formaldehyde polymer encapsulating the perfume, the improvement wherein the shell comprises melamine-formaldehyde polymer and ethylene/maleic anhydride copolymer, thereby improving the perfume retention properties of said encapsulate.

* * * * *